US008683249B2

(12) United States Patent
Kanai et al.

(10) Patent No.: US 8,683,249 B2
(45) Date of Patent: Mar. 25, 2014

(54) SWITCHING A PROCESSOR AND MEMORY TO A POWER SAVING MODE WHEN WAITING TO ACCESS A SECOND SLOWER NON-VOLATILE MEMORY ON-DEMAND

(75) Inventors: Tatsunori Kanai, Yokohama (JP); Yutaka Yamada, Kawasaki (JP); Hideki Yoshida, Tokyo (JP); Masaya Tarui, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 147 days.

(21) Appl. No.: 13/310,892

(22) Filed: Dec. 5, 2011

(65) Prior Publication Data

US 2012/0117407 A1 May 10, 2012

Related U.S. Application Data

(63) Continuation of application No. PCT/JP2009/066167, filed on Sep. 16, 2009.

(51) Int. Cl.
*G06F 1/26* (2006.01)

(52) U.S. Cl.
USPC .......................................................... 713/323

(58) Field of Classification Search
USPC .......................................................... 713/323
See application file for complete search history.

(56) References Cited

U.S. PATENT DOCUMENTS

| 5,996,083 A * | 11/1999 | Gupta et al. ................... 713/322 |
| 2003/0070013 A1* | 4/2003 | Hansson ......................... 710/59 |
| 2006/0004984 A1* | 1/2006 | Morris et al. ................... 711/203 |
| 2009/0070612 A1* | 3/2009 | Adelman et al. .............. 713/322 |

FOREIGN PATENT DOCUMENTS

| JP | 2004-362426 | 12/2004 |
| JP | 2006-004284 | 1/2006 |
| JP | 2009-169871 | 7/2009 |

OTHER PUBLICATIONS

International Preliminary Report on Patentability for International Application No. PCT/JP2009/065847 mailed on Apr. 12, 2012.
International Search Report for International Application No. PCT/JP2009/066167 mailed on Oct. 27, 2009.

* cited by examiner

*Primary Examiner* — Thomas Lee
*Assistant Examiner* — Danny Chan
(74) *Attorney, Agent, or Firm* — Amin, Turocy & Watson, LLP

(57) ABSTRACT

According to one embodiment, a computer system comprises a first memory that stores a first program, a second memory that stores a second program or data, a processor, a first and a second power control circuits. The first power control circuit causes the first memory to operate at a first power consumption when detecting change of an input signal to the processor, and causes the first memory to operate at a second power consumption smaller than the first power consumption and transmits a temporary halt instruction to the processor when the execution of the first program or the second program by the processor is completed. The second power control circuit causes the second memory to operate at a third power consumption before the processor executes the second program, reads or writes the data. The second memory accepts read and write operations while operating at the third power consumption.

8 Claims, 4 Drawing Sheets

SWITCHING A PROCESSOR AND MEMORY TO A POWER SAVING MODE WHEN WAITING TO ACCESS A SECOND SLOWER NON-VOLATILE MEMORY ON-DEMAND

CROSS REFERENCE TO RELATED APPLICATIONS

This application is based on the International Application No. PCT/JP2009/066167, filed on Sep. 16, 2009, the entire contents of which are incorporated herein by reference.

FIELD

Embodiments described herein relate generally to a computer system and a computer system control method.

BACKGROUND

A computer system includes a processor that executes a process, a main storage memory that stores data and program, and an input/output port that inputs and outputs data. Many computer systems switch into standby mode, in which power consumption is small, when there is no process to be executed by the processor, such as when a computer waits for input data. When a computer system in standby mode is notified that input data occurs from outside by means of an interrupt or the like, the computer system switches into execution mode and restarts a process.

The computer system in standby mode stops circuit operation, lowers operation clock frequency that drives the circuit, lowers power supply voltage supplied to the circuit, or stops power supply to the circuit, so that the power consumption is reduced. However, data necessary when the standby mode is switched to the execution mode and the process is restarted is required to be stored during the standby mode.

Therefore, for example, when the execution mode is switched to the standby mode, data necessary to restart the process is written from a volatile register or a main storage memory (for example, DRAM) to a nonvolatile storage device such as a flash memory or an HDD. In this method, power supply to the register and the main storage memory can be stopped during the standby mode, so that the power consumption can be reduced. However, it is necessary to restore data from the nonvolatile storage device to the register and the main storage memory when the standby mode is switched to the execution mode, so that there is a problem that it takes time to restart the process.

A method is known in which a nonvolatile memory that can be rapidly and randomly accessed such as MRAM and FeRAM is used as a main storage memory. In this method, data necessary to restart the process is not deleted even when power supply to the main storage memory is stopped during the standby mode, so that the power consumption can be reduced. However, if the capacity of the nonvolatile memory is large, the time necessary to start the nonvolatile memory and the time necessary to stabilize peripheral circuits of a memory cell are long, so that there is a problem that it takes time to be able to actually restart the process after the standby mode is switched to the execution mode.

DETAILED DESCRIPTION

According to one embodiment, a computer system comprises a first memory that stores a first program, accepts read and write operations while operating at first power consumption, and holds the first program while operating at second power consumption smaller than the first power consumption, a second memory that stores a second program or data, accepts read and write operations while operating at third power consumption, and holds the stored program or data while operating at fourth power consumption smaller than the third power consumption, a processor that executes the first program or the second program at fifth power consumption when receiving a restart instruction and stops execution of the first program or the second program at sixth power consumption smaller than the fifth power consumption when receiving a temporary halt instruction, a first power control circuit that causes the first memory to operate at the first power consumption and transmits the restart instruction to the processor when detecting change of an input signal to the processor, and causes the first memory to operate at the second power consumption and transmits the temporary halt instruction to the processor when the execution of the first program or the second program by the processor is completed, and a second power control circuit that causes the second memory to operate at the third power consumption before the processor executes the second program, or before the processor reads the data, or before the processor writes the data.

Embodiments will now be explained with reference to the accompanying drawings.

Figure 1:
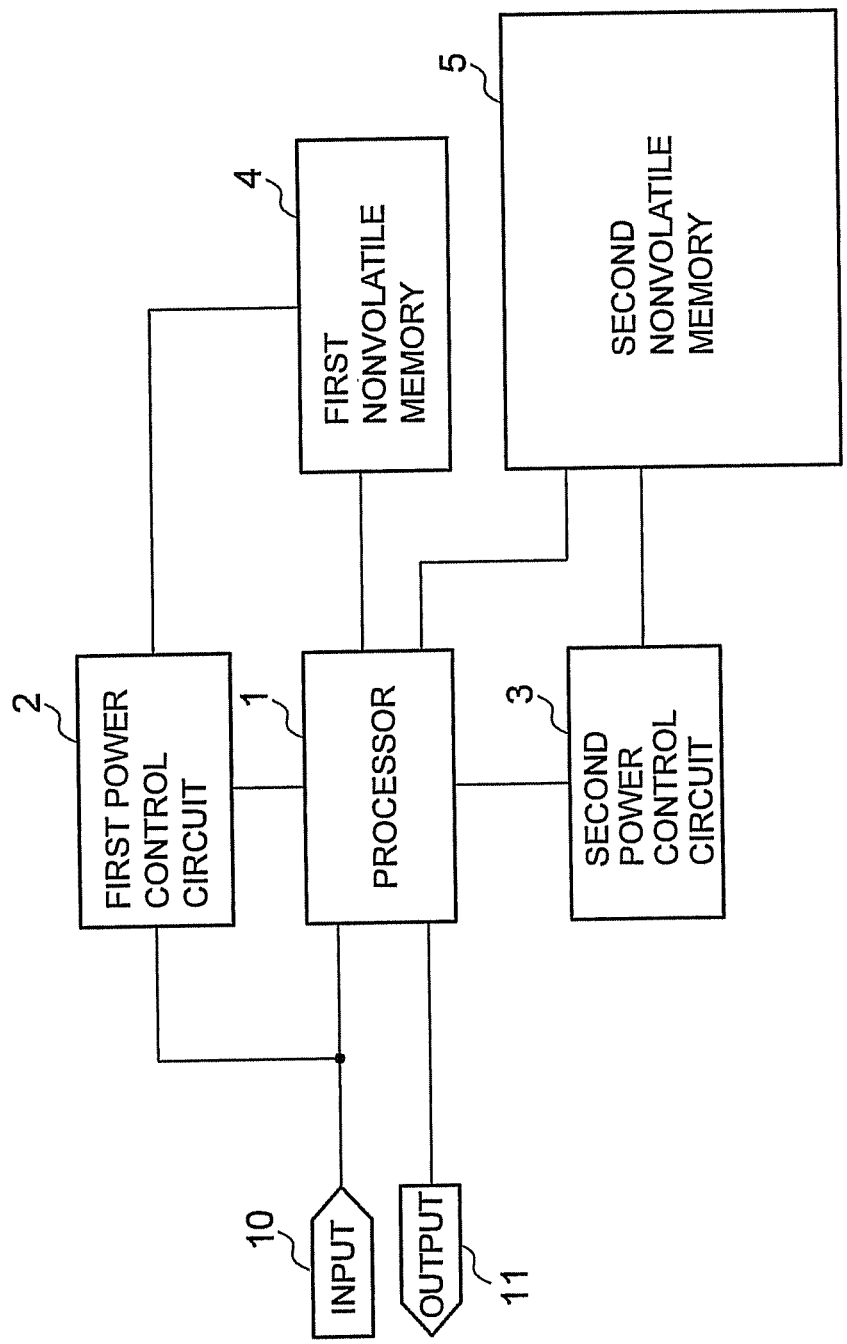
FIG. 1 is a schematic configuration diagram of a computer system according to an embodiment.

FIG. 1 shows a schematic configuration of a computer system according to the embodiment of the present invention. The computer system includes a processor 1, a first power control circuit 2, a second power control circuit 3, a first nonvolatile memory 4, a second nonvolatile memory 5, an input port 10, and an output port 11.

The processor 1 receives input data from outside via the input port 10. The processor 1 executes a program stored in the first nonvolatile memory 4 and/or the second nonvolatile memory 5 and processes the input data. The processor 1 can output data to the outside via the output port 11. A timer can be set on the processor 1 so that an interrupt occurs at a desired time.

A state in which the processor 1 executes the program stored in the first nonvolatile memory 4 and/or the second nonvolatile memory 5 is referred to as an execution mode of the processor 1. A state in which the processor 1 waits for an interrupt caused by a change of input data of the input port 10 or a timer interrupt in a low power consumption state is referred to as a standby mode of the processor 1.

The power consumption of the processor 1 in the standby mode is smaller than the power consumption of the processor 1 in the execution mode. In the standby mode of the processor 1, it is possible to reduce the power consumption by lowering the operation frequency of the processor 1, lowering the operation voltage of the processor 1, stopping the operation of the circuit of the processor 1, or stopping power supply to the entire circuit or a part of the circuit of the processor 1.

Currently, many processors contain a power control circuit and can reduce the power consumption by changing the operation frequency, changing the operation voltage, partially stopping operation of the circuit, or partially stopping power supply to the circuit in accordance with a state of a process.

In many processors, when predetermined data is written to a power control register in the processor, the power control circuit can put the processor into the low power consumption state. There is a processor that can execute a program at low speed in the low power consumption state and a processor that stops execution of a program in the low power consumption state.

In the processor that can execute a program at low speed in the low power consumption state, when predetermined data is written to a power control register in the processor, the power control circuit can put the processor into a state in which the power consumption is high.

In the processor that stops execution of a program in the low power consumption state, the power control circuit monitors an interrupt from outside and a timer interrupt, and when the power control circuit detects an occurrence of an interrupt, the power control circuit can put the processor into a program execution state in which the power consumption is high.

When such an existing processor is used as the processor 1, the program execution state corresponds to the execution mode, and the low power consumption state corresponds to the standby mode. Among functions of the first power control circuit 2 described later, a function to switch the processor 1 between the execution mode and the standby mode can be realized by using a function of the power control circuit contained in the processor.

The first nonvolatile memory 4 stores a program (interrupt processing routine) that defines contents to be processed when the processor 1 receives an interrupt from outside. The first nonvolatile memory 4 may store a network protocol processing program.

A state in which the processor 1 can read a program and data stored in the first nonvolatile memory 4 and the processor 1 can write a program and data to the first nonvolatile memory 4 is referred to as an execution mode of the first nonvolatile memory 4. A state in which the processor 1 cannot read a program and data stored in the first nonvolatile memory 4, the processor 1 cannot write a program and data to the first nonvolatile memory 4, and the first nonvolatile memory 4 holds stored programs and data at low power consumption is referred to as a standby mode of the first nonvolatile memory 4. The power consumption of the first nonvolatile memory 4 in the standby mode is smaller than the power consumption of the first nonvolatile memory 4 in the execution mode.

A nonvolatile memory that can be rapidly and randomly accessed, such as MRAM and FeRAM having a small capacity, is used as the first nonvolatile memory 4. A low power consumption SRAM may be used as the first nonvolatile memory 4. The first nonvolatile memory 4 has a capacity smaller than that of the second nonvolatile memory 5. A memory having a small capacity has a small circuit scale, so that when the circuit state changes, the time necessary for the entire circuit to be able to operate stably is short.

The time necessary to switch the first nonvolatile memory 4 from the standby mode to the execution mode is shorter than the time necessary to switch the second nonvolatile memory 5 from the standby mode to the execution mode.

When a nonvolatile memory that can be rapidly and randomly accessed, such as MRAM and FeRAM, is used as the first nonvolatile memory 4, a circuit to turn on/off power supply to a memory to be used is provided in the first power control circuit 2 described later. When the first power control circuit 2 turns on the power supply to the first nonvolatile memory 4, the first nonvolatile memory 4 can be switched from the standby mode to the execution mode, and when the first power control circuit 2 turns off the power supply to the first nonvolatile memory 4, the first nonvolatile memory 4 can be switched from the execution mode to the standby mode.

A low power consumption SRAM has a standby state in which read and write operations cannot be performed but data can be continuously held with a power consumption smaller than that in a normal operation in addition to a state in which usual read and write operations can be performed. When the low power consumption SRAM is used as the first nonvolatile memory 4, the first nonvolatile memory 4 is switched from the execution mode to the standby mode when the first power control circuit 2 described later transmits a signal instructing the low power consumption SRAM to be in the standby state. The first nonvolatile memory 4 is switched from the standby mode to the execution mode when the first power control circuit 2 transmits a signal instructing the low power consumption SRAM to cancel the standby state.

When MRAM or FeRAM having the standby state is used as the first nonvolatile memory 4, the first nonvolatile memory 4 can be switched to the standby mode when the MRAM or FeRAM is put into the standby state in the same way as the low power consumption SRAM.

When a memory having the standby state is used as the first nonvolatile memory 4, there is a small power consumption even during the standby mode. In the present embodiment, the first nonvolatile memory 4 has a capacity smaller than that of the second nonvolatile memory 5, so that there is an effect to reduce the power consumption during the standby mode.

The second nonvolatile memory 5 stores a program executed by the processor 1 and/or data accessed by the processor 1. A state in which the processor 1 can read a program and data stored in the second nonvolatile memory 5 and the processor 1 can write a program and data to the second nonvolatile memory 5 is referred to as an execution mode of the second nonvolatile memory 5. A state in which the processor 1 cannot read a program and data stored in the second nonvolatile memory 5, the processor 1 cannot write a program and data to the second nonvolatile memory 5, and the second nonvolatile memory 5 holds stored programs and data at low power consumption is referred to as a standby mode of the second nonvolatile memory 5. The power consumption of the second nonvolatile memory 5 in the standby mode is smaller than the power consumption of the second nonvolatile memory 5 in the execution mode.

MRAM, FeRAM, or the like is used as the second nonvolatile memory 5 in the same way as in the first nonvolatile memory 4. The switching of the second nonvolatile memory 5 between the execution mode and the standby mode is the same as that of the first nonvolatile memory 4.

The first power control circuit 2 controls whether the processor 1 and the first nonvolatile memory 4 are respectively put into the execution mode or the standby mode. The first power control circuit 2 monitors an input signal inputted into the processor 1 from outside via the input port 10 and can detect change of the input signal (interrupt). The first power control circuit 2 switches the processor 1 to the execution mode when the first power control circuit 2 determines that a process to be executed by the processor 1 occurs by a change of input data at the input port 10 or the timer interrupt. The first power control circuit 2 switches the processor 1 to the standby mode of low power consumption when there is no process to be executed by the processor 1.

When the first power control circuit 2 switches the processor 1 to the execution mode, the first power control circuit 2 also switches the first nonvolatile memory 4 to the execution mode and puts the first nonvolatile memory 4 into a state in which read and write from the processor 1 are possible. When the first power control circuit 2 switches the processor 1 to the standby mode, the first power control circuit 2 also switches the first nonvolatile memory 4 to the standby mode and puts the first nonvolatile memory 4 into a state in which read and write from the processor 1 are impossible. Even when the first nonvolatile memory 4 is switched to the standby mode, the first nonvolatile memory 4 can continuously store data.

When the first power control circuit 2 switches the processor 1 and the first nonvolatile memory 4 from the standby mode to the execution mode, the time necessary for the processor 1 to switch from the standby mode to the execution mode and start execution of the program is not necessarily the same as the time necessary for the first nonvolatile memory 4 to switch from the standby mode to the execution mode and be in a state in which read and write from the processor 1 are possible. Therefore, if the processor 1 switches to the execution mode earlier than the first nonvolatile memory 4, the processor 1 can wait until the first nonvolatile memory 4 switches to the execution mode.

The first power control circuit 2 may shift the timing at which the first power control circuit 2 switches the processor 1 from the standby mode to the execution mode from the timing at which the first power control circuit 2 switches the first nonvolatile memory 4 from the standby mode to the execution mode so that the first nonvolatile memory 4 switches to the execution mode earlier than the processor 1.

The second power control circuit 3 controls whether the second nonvolatile memory 5 is put into the execution mode or the standby mode. The processor 1 can instruct the second power control circuit 3 to switch the second nonvolatile memory 5 from the standby mode to the execution mode or from the execution mode to the standby mode. The second power control circuit 3 switches the second nonvolatile memory 5 from the execution mode to the standby mode or from the standby mode to the execution mode on the basis of the instruction from the processor 1.

When the second power control circuit 3 switches the second nonvolatile memory 5 from the standby mode to the execution mode, the second nonvolatile memory 5 enters a state in which read and write from the processor 1 are possible. When the second power control circuit 3 switches the second nonvolatile memory 5 from the execution mode to the standby mode, the second nonvolatile memory 5 enters a state in which read and write from the processor 1 are impossible. Even when the second nonvolatile memory 5 is switched to the standby mode, the second nonvolatile memory 5 can continuously store data.

Figure 2:
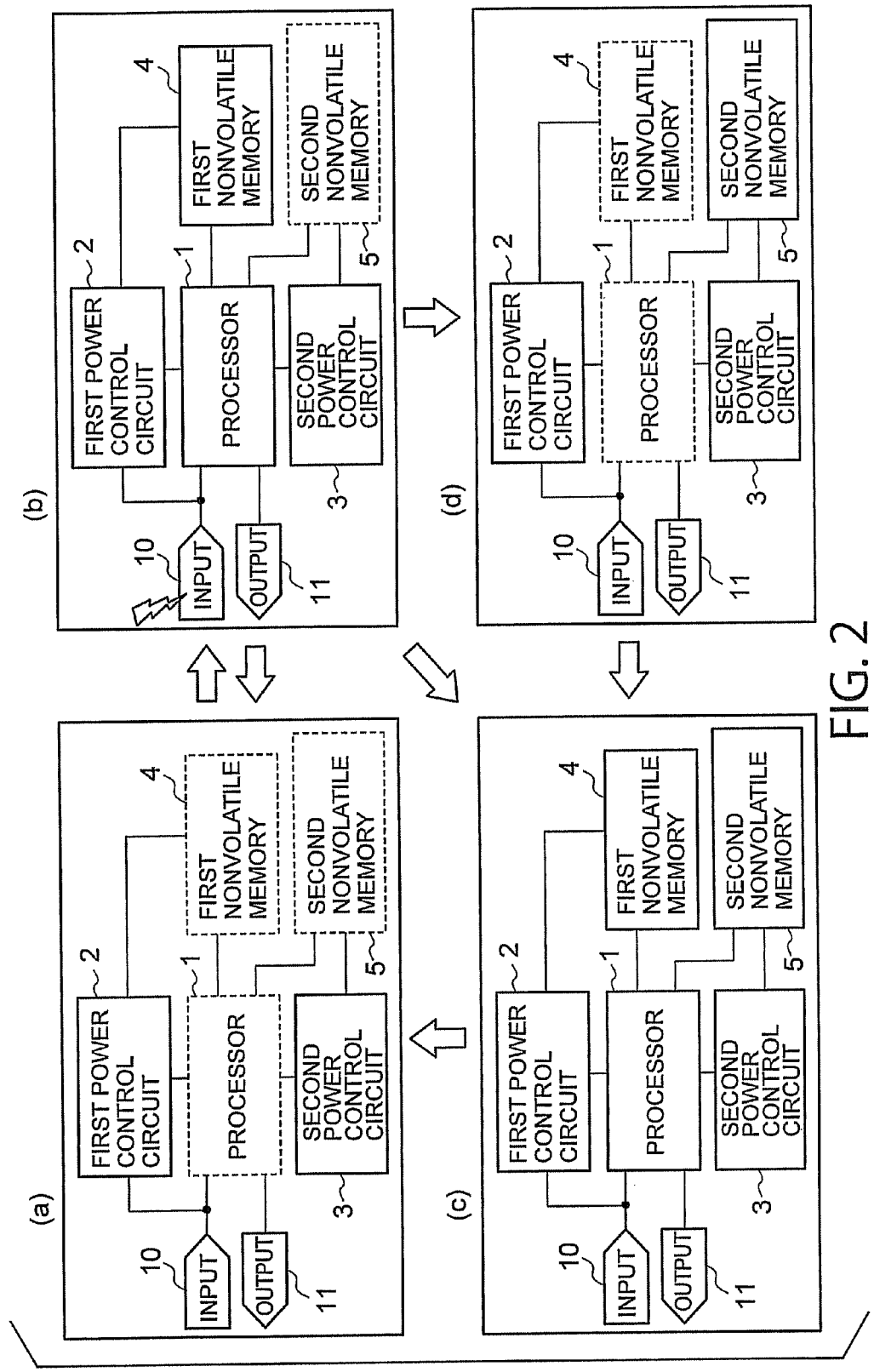
FIG. 2 is a state transition diagram of the computer system.

State transitions of the processor 1, the first nonvolatile memory 4, and the second nonvolatile memory 5 will be described with reference to FIG. 2. In FIG. 2, blocks of the processor 1, the first nonvolatile memory 4, and the second nonvolatile memory 5 are depicted by a solid line when it is in the execution mode and depicted in a dotted line when it is in the standby mode.

FIG. 2(a) shows a state of the computer system which has no process to be executed by the processor 1. In this case, the processor 1, the first nonvolatile memory 4, and the second nonvolatile memory 5 are in the standby mode, and the power consumption of the entire computer system is small.

As shown in FIG. 2(b), when new input data is provided from outside and cause of interrupt occurs, the first power control circuit 2 detects the occurrence of the cause of interrupt. When the first power control circuit 2 detects the occurrence of the cause of interrupt, the first power control circuit 2 transmits a restart instruction to the processor 1 and switches the processor 1 from the standby mode to the execution mode in order to process the interrupt. The first power control circuit 2 switches the first nonvolatile memory 4 from the standby mode to the execution mode. The capacity of the first nonvolatile memory 4 is small, so that the first nonvolatile memory 4 switches quickly from the standby mode to the execution mode.

The processor 1, which receives the restart instruction and switches to the execution mode, determines whether the interrupt processing can be executed by only the program or data stored in the first nonvolatile memory 4 or the interrupt processing requires the program or data stored in the second nonvolatile memory 5.

When the interrupt processing can be executed by only the program or data stored in the first nonvolatile memory 4, the processor 1 reads the program from the first nonvolatile memory 4, executes the program, and completes the interrupt processing. After the completion of the interrupt processing, the first power control circuit 2 transmits a temporary halt instruction to the processor 1 and switches the processor 1 from the execution mode to the standby mode. The first power control circuit 2 switches the first nonvolatile memory 4 from the execution mode to the standby mode. Thereby, the computer system returns to the low power consumption state shown in FIG. 2(a).

When the interrupt processing requires the program or data stored in the second nonvolatile memory 5, the processor 1 instructs the second power control circuit 3 to switch the second nonvolatile memory 5 from the standby mode to the execution mode. The second power control circuit 3 switches the second nonvolatile memory 5 from the standby mode to the execution mode on the basis of the instruction from the processor 1.

The capacity of the second nonvolatile memory 5 is larger than that of first nonvolatile memory 4, so that the time necessary for the second nonvolatile memory 5 to switch from the standby mode to the execution mode is long. If there is a process that can be executed by only the program or data stored in the first nonvolatile memory 4, the processor 1 executes the process while the mode of the second nonvolatile memory 5 is being changed.

After executing the process, if the second nonvolatile memory 5 is in the execution mode as shown in FIG. 2(c), the processor 1 completes the interrupt processing by using the program or data stored in the second nonvolatile memory 5. After the completion of the interrupt processing, the first power control circuit 2 transmits a temporary halt instruction to the processor 1 and switches the processor 1 from the execution mode to the standby mode. The first power control circuit 2 switches the first nonvolatile memory 4 from the execution mode to the standby mode. The second power control circuit 3 switches the second nonvolatile memory 5 from the execution mode to the standby mode. The second power control circuit 3 may switch the mode of the second nonvolatile memory 5 based on an instruction from the processor 1 which has completed the interrupt processing or based on switching of the processor 1 and the first nonvolatile memory 4 to the standby mode by monitoring the states of the processor 1 and the first nonvolatile memory 4. Thereby, the computer system returns to the low power consumption state shown in FIG. 2(a).

On the other hand, if the capacity of the second nonvolatile memory 5 is extremely large, even when the process that can be executed by only the program or data stored in the first nonvolatile memory 4 is completed, the second nonvolatile memory may not yet have switched from the standby mode to the execution mode. In this case, the processor 1 and the first nonvolatile memory 4 are put into the standby mode as shown in FIG. 2(d) until the second nonvolatile memory 5 switches to the execution mode so that the consumption power can be reduced.

Therefore, if the capacity of the second nonvolatile memory 5 is extremely large, the processor 1 instructs the second power control circuit 3 to switch the second nonvolatile memory 5 from the standby mode to the execution mode and sets a timer so that an interrupt occurs at a time when the second nonvolatile memory 5 switches to the execution mode. When the timer interrupt occurs, the processor 1 detects the interrupt and the first power control circuit 2 transmits a restart instruction to the processor 1 and switches the processor 1 from the standby mode to the execution mode. The first power control circuit 2 switches the first nonvolatile memory 4 from the standby mode to the execution mode. The timer setting time is determined from the time necessary for the second nonvolatile memory 5 to switch the mode, which is estimated from the capacity of the second nonvolatile memory 5.

As described above, the computer system according to the present embodiment includes the first nonvolatile memory 4 which has a small capacity and quickly switches from the standby mode to the execution mode and the second nonvolatile memory 5 which has a large capacity and takes time to switch the mode and executes a simple process by using program or data stored in the first nonvolatile memory 4. It is not necessary to switch the mode of the second nonvolatile memory 5, so that the time necessary to restart a process from the low power consumption state (state of FIG. 2(a)) can be shortened.

When a process that requires program or data stored in the second nonvolatile memory 5 is executed, a simple process using the program or data stored in the first nonvolatile memory 4 can be executed while the mode of the second nonvolatile memory 5 is being switched, so that the processes can be efficiently executed.

Figure 3:
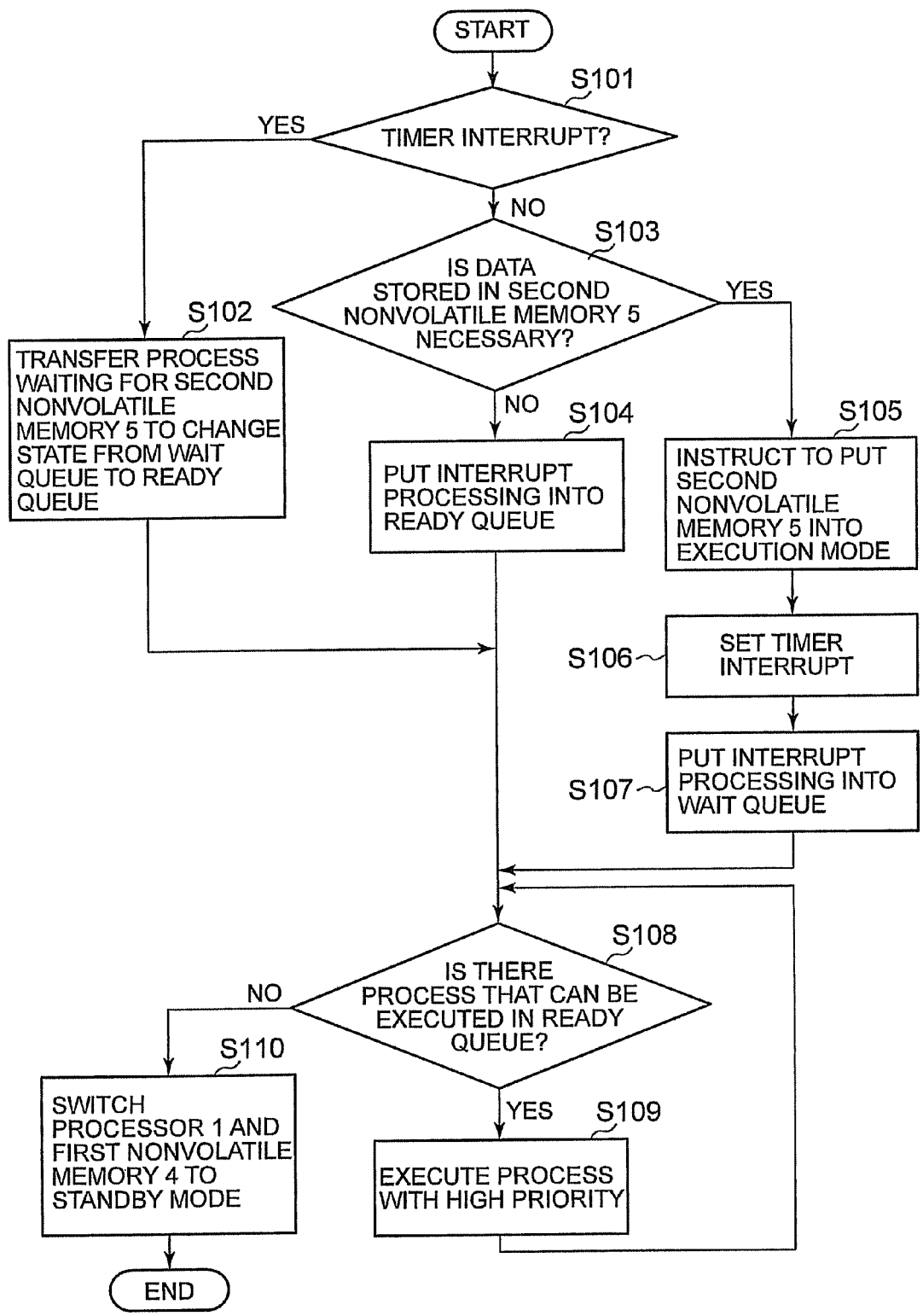
FIG. 3 is a flowchart for explaining an operation of a processor.

Next, the operation of the processor 1 when an interrupt occurs will be described with reference to a flowchart shown in FIG. 3. Normally, a program running on the processor 1 is managed by an operating system (OS). The OS has a ready queue for managing processes which can be executed and a wait queue for managing processes which waits for an event such as an interrupt and cannot be executed.

(Step S101) It is determined whether or not the interrupt that occurred is a timer interrupt which notifies that the second nonvolatile memory 5 enters the execution mode. If the interrupt is the timer interrupt, the procedure proceeds to step S102, and if the interrupt is not the timer interrupt (the interrupt is an interrupt from outside), the procedure proceeds to step S103.

(Step S102) A process waiting for the second nonvolatile memory 5 to enter the execution mode is taken from the wait queue and put into the ready queue.

(Step S103) It is determined whether or not the program or data stored in the second nonvolatile memory 5 is required by a process corresponding to the interrupt that occurred. If the program or data stored in the second nonvolatile memory 5 is required, the procedure proceeds to step S105, and if the program or data stored in the second nonvolatile memory 5 is not required, the procedure proceeds to step S104.

(Step S104) The process corresponding to the interrupt that occurred is put into the ready queue.

(Step S105) The processor 1 instructs the second power control circuit 3 to put the second nonvolatile memory 5 into the execution mode.

(Step S106) The processor 1 sets a timer so that an interrupt occurs when the second nonvolatile memory 5 enters the execution mode.

(Step S107) The process corresponding to the interrupt that occurred is set in a state for waiting for the second nonvolatile memory 5 to enter the execution mode and put into the wait queue.

(Step S108) It is determined whether or not there is a process that can be executed in the ready queue. If there is a process that can be executed, the procedure proceeds to step S109, and if there is no process that can be executed, the procedure proceeds to step S110.

(Step S109) Processes are taken from the ready queue in decreasing order of priority and executed.

(Step S110) The processor 1 and the first nonvolatile memory 4 are switched to the standby mode and it is waited that a new interrupt occurs.

If the interrupt set by the timer in step S106 occurs in step S109, the process put into the wait queue in step S107 is transferred to the ready queue. When all the processes are completed, the processor 1, the first nonvolatile memory 4, and the second nonvolatile memory 5 are switched to the standby mode in step S110.

In the present embodiment, if a process corresponding to an interrupt that occurred can be executed by only the program or data stored in the first nonvolatile memory 4 having a small capacity, the process can be quickly restarted from the low power consumption state without switching the mode of the second nonvolatile memory 5 having a large capacity. The processor 1 and the first nonvolatile memory 4 can be put into the standby mode while the mode of the second nonvolatile memory 5 is being switched, so that the power consumption of the entire computer system can be further reduced.

In this way, in the computer system according to the present embodiment, the nonvolatile memory having a small capacity is switched from the standby mode to the execution mode earlier than the nonvolatile memory having a large capacity, so that it is possible to shorten the time necessary to restart a process from the low power consumption state.

Figure 4:
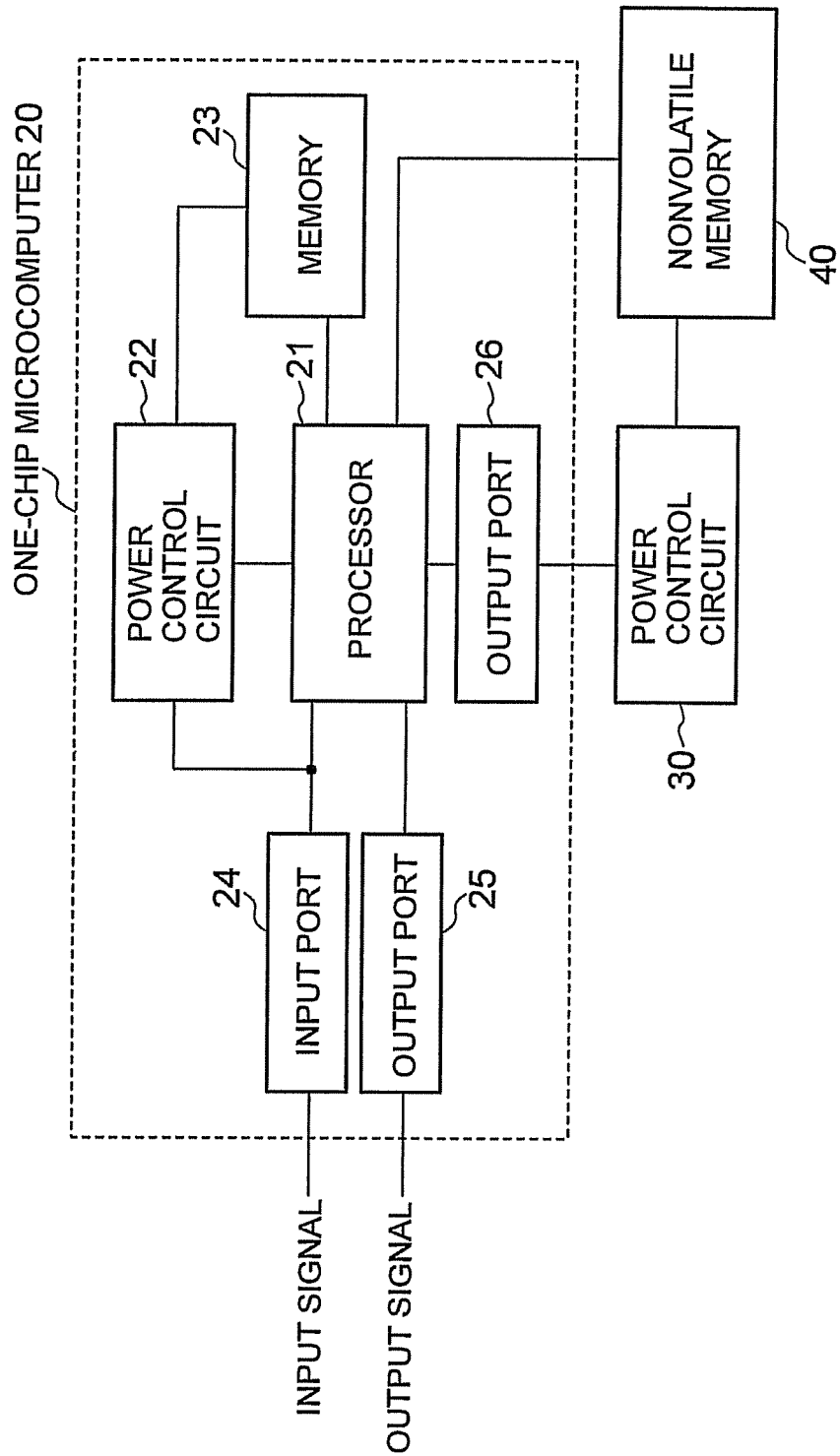
FIG. 4 is a schematic configuration diagram of a one-chip microcomputer according to the embodiment.

As shown in FIG. 4, the computer system according to the above-described embodiment can be applied to a combination of a one-chip microcomputer 20, an external power control circuit 30, and an external nonvolatile memory 40. The one-chip microcomputer 20 contains a processor 21, a memory 23 used to execute a program, an input port 24, and output ports 25 and 26. The one-chip microcomputer 20 has an execution mode for executing a program and a standby mode for waiting at a low power consumption. Data in the memory 23 contained in the one-chip microcomputer 20 is held so that the data is not lost even in the standby mode. A switching between the execution mode and the standby mode is controlled by a power control circuit 22 contained in the one-chip microcomputer 20.

When comparing FIGS. 1 and 4, the processor 1 corresponds to the processor 21. Similarly, the first power control circuit 2 corresponds to the power control circuit 22, the first nonvolatile memory 4 corresponds to the memory 23, the second power control circuit 3 corresponds to the power control circuit 30, and the second nonvolatile memory 5 corresponds to the nonvolatile memory 40. The processor 21 instructs the power control circuit 30 to switch the nonvolatile memory 40 to the execution mode or the standby via the output port 26. If the nonvolatile memory 40 is MRAM or FeRAM, the power control circuit 30 cuts off the power supply to the nonvolatile memory 40 when the nonvolatile memory 40 is in the standby mode. In this way, even when the computer system according to the above-described embodiment is applied to the one-chip microcomputer 20 and the external circuits thereof, the same effect as that of the above-described embodiment can be obtained.

Although, in the above embodiment, the second power control circuit 3 is provided with power supply at all times, the power supply to the second power control circuit 3 may be cut off and the power consumption may be further reduced when the second nonvolatile memory 5 shown in FIGS. 2(*a*) and 2(*b*) is in the standby mode. The power supply to the second power control circuit 3 is controlled by, for example, the first power control circuit 2.

In the above embodiment, an SRAM which contains a small battery and has a battery backup function may be used as the first nonvolatile memory 4.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A computer system comprising:
a first nonvolatile memory that stores a first program, accepts read and write operations while operating at a first power consumption, and holds the first program while operating at a second power consumption smaller than the first power consumption;
a second nonvolatile memory that stores a second program or data, accepts read and write operations while operating at a third power consumption, and holds the stored program or data while operating at a fourth power consumption smaller than the third power consumption;
a processor that executes the first program or the second program at a fifth power consumption when receiving a restart instruction and stops execution of the first program or the second program at a sixth power consumption smaller than the fifth power consumption when receiving a temporary halt instruction;
a first power control circuit that causes the first nonvolatile memory to operate at the first power consumption and transmits the restart instruction to the processor when detecting change of an input signal to the processor, and causes the first nonvolatile memory to operate at the second power consumption and transmits the temporary halt instruction to the processor when the execution of the first program or the second program by the processor is completed; and
a second power control circuit that causes the second nonvolatile memory to operate at the third power consumption before the processor executes the second program, or before the processor reads the data, or before the processor writes the data,
wherein time necessary for the first nonvolatile memory to be able to accept the read and write operations from the processor from when the first power control circuit causes the first nonvolatile memory to operate at the first power consumption is shorter than time necessary for the second nonvolatile memory to be able to accept the read and write operations from the processor from when the second power control circuit causes the second nonvolatile memory to operate at the third power consumption.

2. The computer system according to claim 1, wherein the second nonvolatile memory has a capacity larger than that of the first nonvolatile memory.

3. The computer system according to claim 2, wherein the second power control circuit causes the second nonvolatile memory to operate at the fourth power consumption when the processor completes execution of the second program, or when the processor completes reading the data, or when the processor completes writing the data.

4. The computer system according to claim 3, wherein
the processor performs setting so that an interrupt occurs after a predetermined time period when the second power control circuit causes the second nonvolatile memory to operate at the third power consumption, and
the first power control circuit causes the first nonvolatile memory to operate at the first power consumption and transmits the restart instruction to the processor on the basis of occurrence of the interrupt.

5. A method of controlling a computer system, the computer system including:
a first nonvolatile memory that stores a first program, accepts read and write operations while operating at a first power consumption, and holds the first program while operating at a second power consumption smaller than the first power consumption;
a second nonvolatile memory that stores a second program or data, accepts read and write operations while operating at a third power consumption, and holds the stored program or data while operating at a fourth power consumption smaller than the third power consumption; and
a processor that executes the first program or the second program at a fifth power consumption when receiving a restart instruction and stops execution of the first program or the second program at a sixth power consumption smaller than the fifth power consumption when receiving a temporary halt instruction, the method comprising:
causing the first nonvolatile memory to operate at the first power consumption and transmitting the restart instruction to the processor when a change of an input signal to the processor is detected;
causing the first nonvolatile memory to operate at the second power consumption and transmitting the temporary halt instruction to the processor when the execution of the first program or the second program by the processor is completed; and
causing the second nonvolatile memory to operate at the third power consumption before the processor executes the second program, or before the processor reads the data, or before the processor writes the data,
wherein time between the first nonvolatile memory is caused to operate at the first power consumption and the first nonvolatile memory accepts the read and write operations from the processor is shorter than time between the second nonvolatile memory is caused to operate at the third power consumption and the second nonvolatile memory accepts the read and write operations from the processor.

6. The method according to claim 5, wherein the second nonvolatile memory has a capacity larger than that of the first nonvolatile memory.

7. The method according to claim 6, further comprising
causing the second nonvolatile memory to operate at the fourth power consumption when the processor completes execution of the second program, or when the processor completes reading the data, or when the processor completes writing the data.

8. The method according to claim 7, further comprising:
setting the processor to occur an interrupt after a predetermined time period when the second nonvolatile memory is caused to operate at the third power consumption; and
causing the first nonvolatile memory to operate at the first power consumption and transmitting the restart instruction to the processor on the basis of occurrence of the interrupt.

* * * * *